United States Patent
Irudayam et al.

(10) Patent No.: US 10,109,139 B2
(45) Date of Patent: Oct. 23, 2018

(54) MOVABLE PLATEN IN DOCUMENT HANDLING SYSTEMS FOR AN AUTOMATED TELLER MACHINE

(71) Applicant: Diebold Nixdorf, Incorporated, North Canton, OH (US)

(72) Inventors: Sathish Irudayam, North Canton, OH (US); Timothy Allison, Massillon, OH (US); Jeffrey M. Eastman, North Canton, OH (US); Michael James Gardner, Hudson, OH (US); Aaron Christopher Graham, Mogadore, OH (US); John E. McCloskey, Sylvania, OH (US)

(73) Assignee: Diebold Nixdorf Incorporated, North Canton, OH (US)

( * ) Notice: Subject to any disclaimer, the term of this patent is extended or adjusted under 35 U.S.C. 154(b) by 0 days.

(21) Appl. No.: 15/695,719

(22) Filed: Sep. 5, 2017

(65) Prior Publication Data
US 2018/0053367 A1    Feb. 22, 2018

Related U.S. Application Data

(63) Continuation of application No. 14/818,461, filed on Aug. 5, 2015, now Pat. No. 9,754,434.
(Continued)

(51) Int. Cl.
*B65H 7/02*     (2006.01)
*G07D 11/00*    (2006.01)
(Continued)

(52) U.S. Cl.
CPC ..... *G07D 11/0048* (2013.01); *G06K 9/00469* (2013.01); *G07D 11/00* (2013.01);
(Continued)

(58) Field of Classification Search
CPC ....... B65H 2403/531; B65H 3/66; B65H 5/36
See application file for complete search history.

(56) References Cited

U.S. PATENT DOCUMENTS

| 4,280,036 A | 7/1981 | Fukatso |
| 2004/0182675 A1* | 9/2004 | Long ................. B65H 39/10 194/206 |

(Continued)

FOREIGN PATENT DOCUMENTS

| EP | 0 606 959 A2 | 7/1994 |
| WO | 1999/09511 A1 | 2/1999 |
| WO | 2008/047094 A2 | 4/2008 |

OTHER PUBLICATIONS

International Search Report and Written Opinion, dated Oct. 17, 2016, for corresponding PCT Application No. PCT/US2016/034262.

*Primary Examiner* — Howard J Sanders
(74) *Attorney, Agent, or Firm* — Black, McCuskey, Souers & Arbaugh, LPA

(57) ABSTRACT

Systems and methods of the invention relate to reducing a number of jams that can occur in an automated teller machine with the employment of a moveable platen that increases a width of a channel for documents. A document analysis area can receive a document via a first transport path, wherein the document analysis area can include a channel in which the document travels to enable at least one scan component to capture an image of the document. The channel is created by one or more platen. The one or more platen can be movable to increase the width of the channel so as to allow documents to pass through the document analysis area without causing a jam or error for the automated teller machine.

16 Claims, 16 Drawing Sheets

Related U.S. Application Data

(60) Provisional application No. 62/168,544, filed on May 29, 2015.

(51) Int. Cl.
*G07F 19/00* (2006.01)
*G06K 9/00* (2006.01)
*B65H 5/36* (2006.01)
*B65H 3/66* (2006.01)

(52) U.S. Cl.
CPC ..... *G07D 11/0021* (2013.01); *G07D 11/0039* (2013.01); *G07D 11/0063* (2013.01); *G07F 19/20* (2013.01); *G07F 19/201* (2013.01); *G07F 19/202* (2013.01); *G07F 19/203* (2013.01); *G07F 19/205* (2013.01); *B65H 3/66* (2013.01); *B65H 5/36* (2013.01); *B65H 2404/2615* (2013.01); *B65H 2404/2693* (2013.01)

(56) References Cited

U.S. PATENT DOCUMENTS

2014/0001104 A1    1/2014   Petermann et al.
2014/0184713 A1*   7/2014   Murakami ............. B41J 11/005
                                                                           347/104

\* cited by examiner

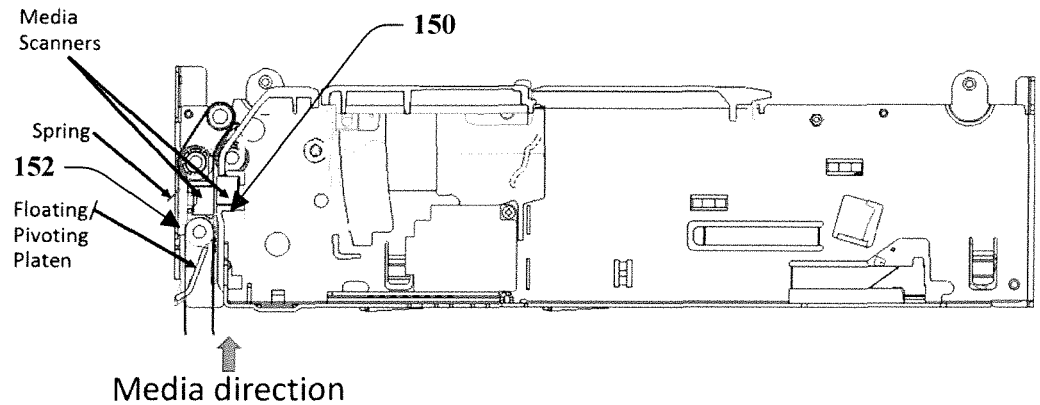
FIG. 7
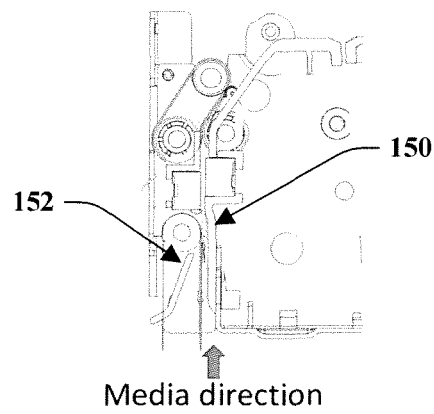 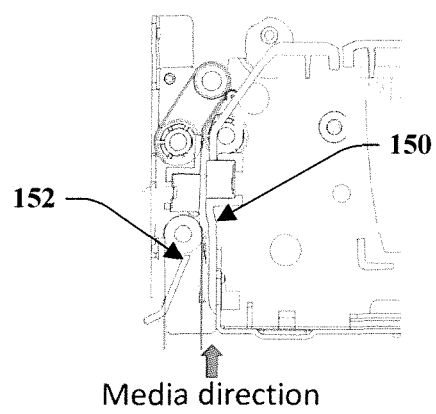
FIG. 8A  FIG. 8B

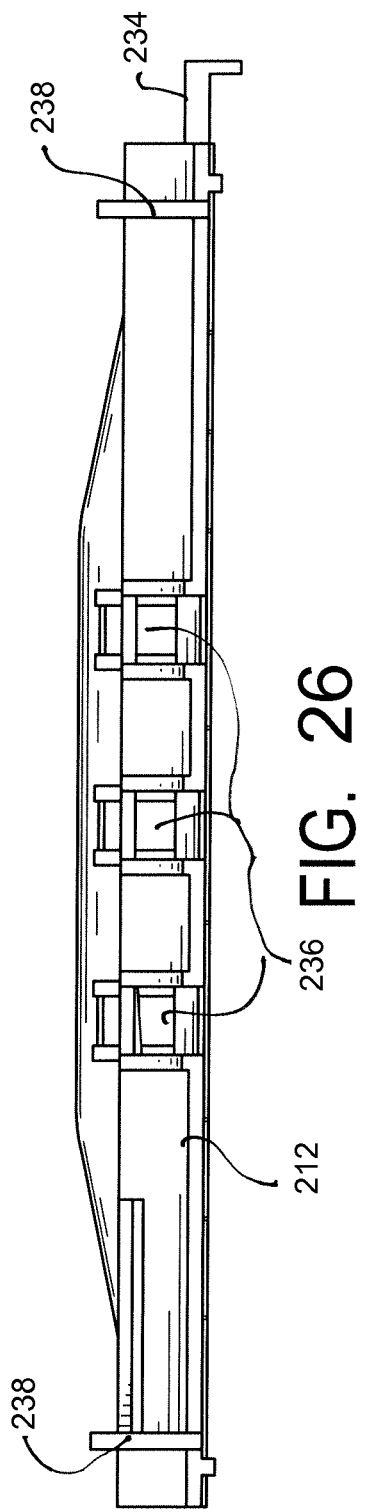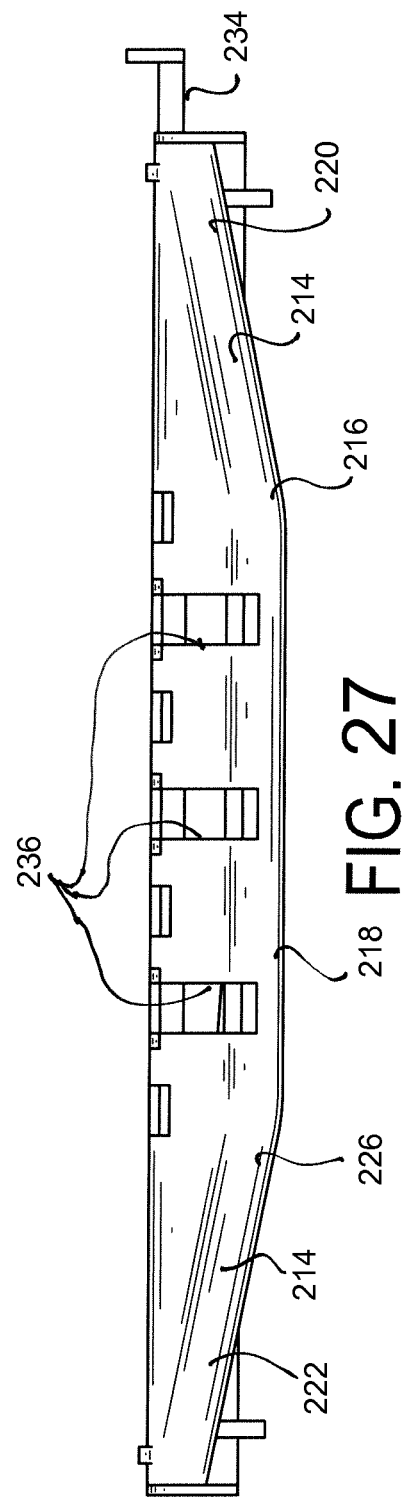

MOVABLE PLATEN IN DOCUMENT HANDLING SYSTEMS FOR AN AUTOMATED TELLER MACHINE

CROSS-REFERENCE TO RELATED APPLICATION(S)

This application is a Continuation of and claims priority to and the benefit of U.S. application Ser. No. 14/818,461, filed Aug. 5, 2015, which claims priority to and the benefit of U.S. Provisional Patent Application No. 62/168,544 filed May 29, 2015, the disclosure of which is expressly incorporated herein by reference.

BACKGROUND

This relates in general to systems for automated financial or commercial transactions. One such system, for example, is the Automated Banking Machine, also known as the Automated Teller Machine or ATM.

Automated Teller Machines are commonly used to carry out a variety of financial or commercial transactions. Most commonly, these transactions include dispensing cash, checking account balances, paying bills and/or receiving deposits from users. ATMs may also perform a variety of other transactions, including the sale and purchase of tickets, issuance of coupons, check or voucher presentation, the printing of script and a variety of other functions.

In carrying out these transactions or performing these functions, a variety of documents may be moved through the Automated Teller Machine. In the process there is a likelihood that a jam, misfeed or other error may occur in the conveyance of such documents. There is a desire to decrease the likelihood of such occurrences.

SUMMARY

In an embodiment, an automated teller machine is provided. The automated teller machine can include a cartridge that stores a document. The automated teller machine can further include a first document delivery system that transports the document from the cartridge to a document analysis area via a first transport path and a second document delivery system that transports the document from the document analysis area. The document analysis area can include a cartridge side platen and a belt side platen opposite thereof positioned to create a channel for the document to travel through, the channel having an entrance and an exit opposite thereof, wherein the entrance has a width to receive the document. The document analysis area can further include a cartridge side scan component partly incorporated into the cartridge side platen and a belt side scan component partly incorporated into the belt side platen. The cartridge side scan component is configured to capture an image of a first side of the document. The belt side scan component is configured to capture an image of a second side opposite the first side of the document and the belt side platen configured to be movable to increase the width of the entrance.

In an embodiment, an automated teller machine is provided. The automated teller machine can include a cartridge that stores a document. The automated teller machine can include a first document delivery system that transports the document from the cartridge to a document analysis area via a first transport path and a second document delivery system that transports the document from the document analysis area to a bin via a second transport path or an opening of the automated teller machine via a third transport path. The document analysis area can include a cartridge side platen and a belt side platen opposite thereof positioned to create a channel for the document to travel through, the channel having an entrance and an exit opposite thereof, wherein the entrance has a width to receive the document. The document analysis area can further include a cartridge side scan component partly incorporated into the cartridge side platen and a belt side scan component partly incorporated into the belt side platen. The cartridge side scan component is configured to capture an image of a first side of the document. The belt side scan component is configured to capture an image of a second side opposite the first side of the document and at least one of the cartridge side platen or the belt side platen configured to be movable to increase the width of the entrance.

In an embodiment, an automated teller machine is provided. The automated teller machine can include a cartridge that stores a document. The automated teller machine can include a first document delivery system that transports the document from the cartridge to a document analysis area via a first transport path. The automated teller machine can include a second document delivery system that transports the document from the document analysis area to a bin via a second transport path or an opening of the automated teller machine via a third transport path. The document analysis area can include a cartridge side platen and a belt side platen opposite thereof positioned to create a channel for the document to travel through, the channel having an entrance and an exit opposite thereof, wherein the entrance has a width to receive the document. The document analysis area can further include a cartridge side scan component partly incorporated into the cartridge side platen and a belt side scan component partly incorporated into the belt side platen. The cartridge side scan component can be configured to capture an image of a first side of the document. The belt side scan component can be configured to capture an image of a second side opposite the first side of the document. The document analysis area can further include a spring mechanism coupled to the belt side platen that provides resistance to maintain a first position for the width of the channel, wherein an increase in a thickness of the document applies a force to the belt side platen, wherein the force moves the belt side platen to a second position to increase the width of the channel.

BRIEF DESCRIPTION OF THE DRAWINGS

Reference is made to the accompanying drawings in which particular embodiments and further benefits of the invention are illustrated as described in more detail in the description below, in which:

FIG. 7 is a side schematic block diagram view of a top portion of an automated teller machine illustrating various banking machine components;

FIG. 8A is a side schematic block diagram view of a document analysis area of an automated teller machine;

FIG. 8B is a side schematic block diagram view of a document analysis area of an automated teller machine;

FIG. 26 is a top view of the belt side platen of FIG. 21; and

FIG. 27 is a bottom view of the belt side platen of FIG. 21.

DETAILED DESCRIPTION

Figure 1:
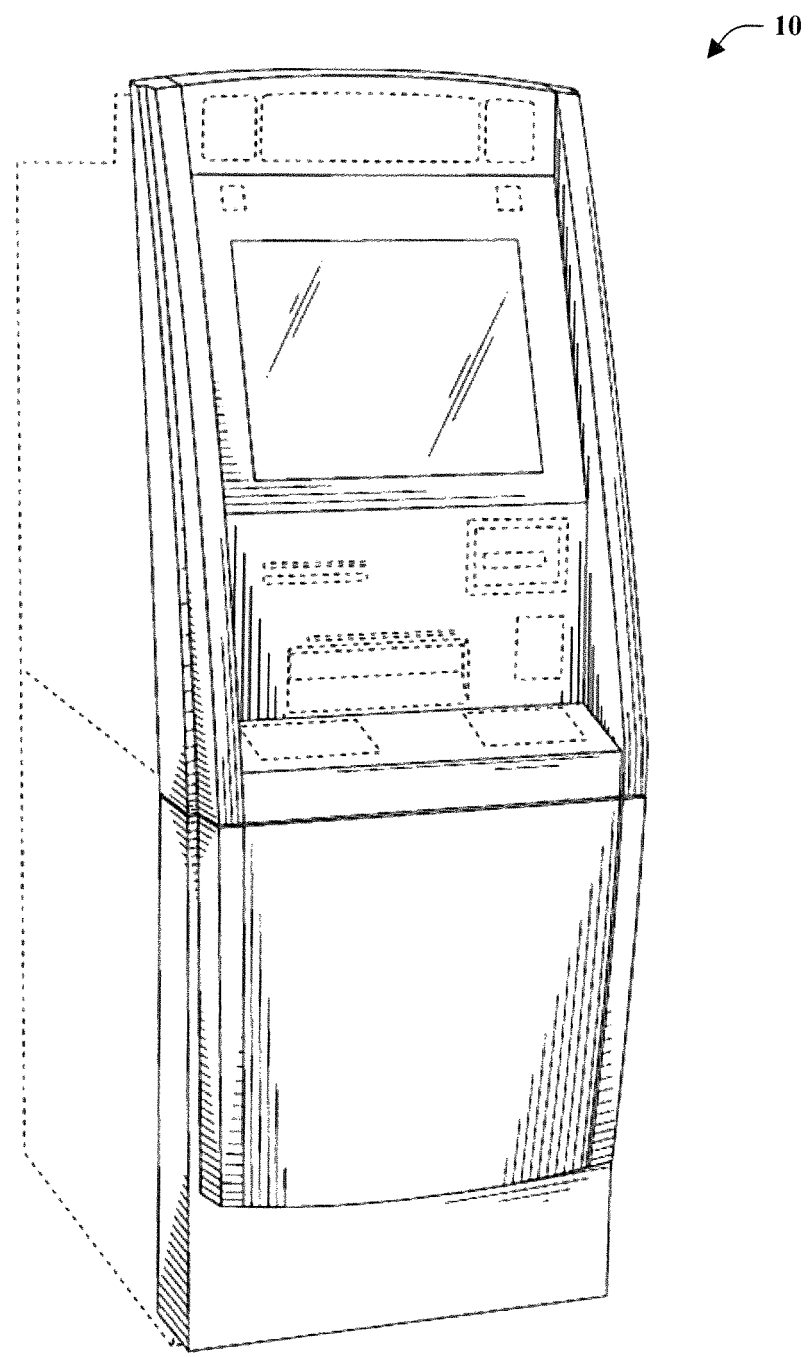
FIG. 1 is an isometric view of an automated teller machine of an exemplary embodiment.

Embodiments of the innovation relate to methods and systems for reducing a number of jams that can occur in an automated teller machine with the employment of a moveable platen that increases a width of a channel for documents. A document analysis area can receive a document via a first transport path, wherein the document analysis area can include a channel in which the document travels to enable at least one scan component to capture an image of the document. The channel is created by one or more platen. The one or more platen can be movable to increase the width of the channel so as to allow documents to pass-through the document analysis area without causing a jam or error for the automated teller machine. Jams and errors require maintenance on the automated teller machine and renders the machine inoperable until the jam is removed which can be costly in both money loss from the automated teller machine being inoperable, but also costs to have service performed.

Many countries enforce standards for a quality of documents, often referred to as "fit level of note" or "fit level of document". However, each country maintains a different minimum threshold for the fit level of a note or document. Still further, there are automated teller machines that recycle documents (e.g., deposited documents are used to be dispensed in response to future transactions). The varying fit level of a document and the possible use of recycling documents often lead to automated teller machines handling notes or documents varying in quality, integrity, and the like. The various quality and integrity of documents can be difficult to account for when a document is transported within an automated teller machine. Often compounding this problem is a misfeed of documents during transport, wherein the misfeed includes pulling more than one document at-a-time for transport. For example, the misfeed can be caused by a mechanical failure or caused by the low fit level of the document. Conventional systems and methods for automated teller machines jam due to a lower quality document or a misfeed. The subject innovation solves this problem by virtually eliminating jams and, in particular, virtually eliminating jams that can occur at a document analysis area where a portion of the document is scanned (e.g., an image of the document is captured, a video of the document is captured, among others). For example, controlled experiments by the inventors of this subject innovation have illustrated that conventional automated teller machines without the subject innovation yield a jam of 1 out of 6,000 documents. Yet, by employment of techniques of this subject innovation, a jam occurrence in the document scanning area is reduced to 1 out of 130,000 documents.

With reference to the drawings, like reference numerals designate identical or corresponding parts throughout the several views. However, the inclusion of like elements in different views does not mean a given embodiment necessarily includes such elements or that all embodiments of the invention include such elements.

The term "document" as used herein can be defined as currency, checks, bills, receipts, tickets, paper, and/or other types of documents. A document can be comprised of a material such as, but not limited to, paper, paper with ink (e.g., black, color, etc.), recycled paper, thermal paper, impact paper, 2-ply paper, inkjet paper, among others. In an embodiment, a document can have a height of approximately 60 mm to 85 mm, a length of approximately 120 mm to 185 mm, and a thickness of approximately 0.05 mm to approximately 0.2 mm.

The term "document analysis area" as used herein can be defined as a location in an automated teller machine where a document is analyzed for authenticity, quality, denomination, number of document(s), and the like. The analysis can be performed by capturing an image of a portion of the document, capturing and evaluating an indicia on the document, capturing a video of the portion of the document, scanning a serial number, identifying an indicia on the document, and/or a combination thereof.

The term "spring mechanism" as used herein can be defined as a device that can apply a force in one or more directions, wherein the force can be a compression or an expansion of the device.

The term "component" or "controller" as used herein can be defined as a portion of hardware, a portion of software, a portion of logic, or a combination thereof. A portion of hardware can include at least a processor and a portion of memory, wherein the memory includes an instruction to execute.

Preliminarily, it should be noted that certain terms used herein, such as "upper", "lower", "middle", "upward", "downward", "top", "bottom", "front", "back", "side", and the like, are used to facilitate the description of the embodiment(s) illustrated in the accompanying figures. Unless otherwise specified or made apparent by the context of the discussion, such terms should be interpreted as intended merely to facilitate the description of the features under discussion. Such terms are not intended as a limitation on the orientation in which components exist or may be used.

Referring now to the drawings, and particularly to FIGS. 1-4, there is illustrated an automated banking machine 10 (also referred herein as "automated teller machine 10," "machine 10," "cash dispensing machine," or "ATM 10") of a first exemplary embodiment. ATM 10 includes a top housing 12 having side walls 14 and 16, and top wall 18. Housing 12 encloses an interior area indicated at 20. Housing 12 has a front opening 22. In this exemplary embodiment, the rear of housing 12 is closed by a rear wall. However, in other embodiments, the rear of housing 12 may be accessible through an access door or similar device. Top housing 12 is used to house certain banking machine components such as, but not limited to, input devices, output devices, among others.

Generally, ATM 10 can be an automated device that can dispense documents, receive documents, communicate with a financial institution, communicate with a user, among others. It is to be appreciated and understood that ATM 10 can be a stand-alone unit (as depicted), partly incorporated into a structure (e.g., interior wall, exterior wall, structure associated with a drive-in access system, structure associated with a walk-up system, and the like), among others.

Figure 3:
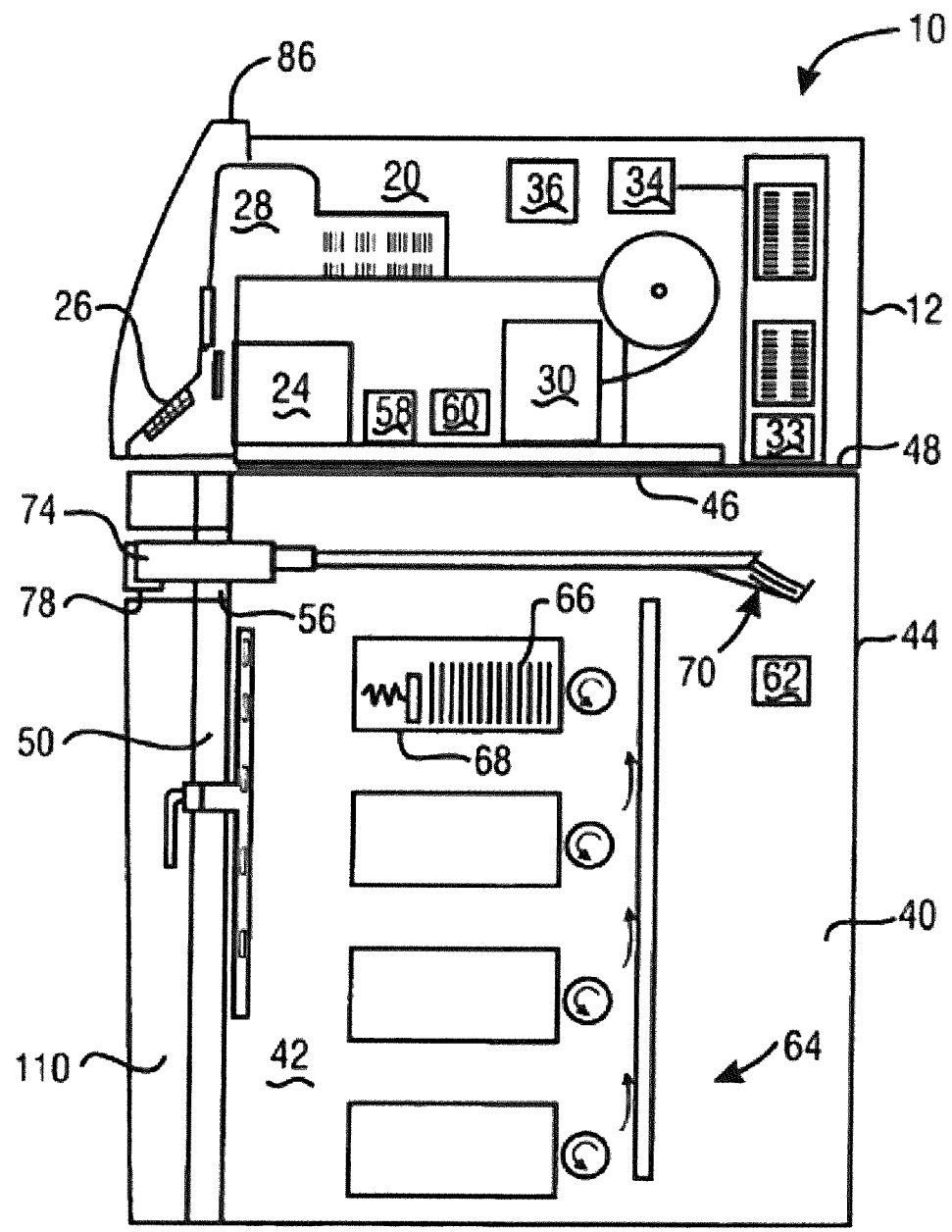
FIG. 3 is a side schematic view of an automated teller machine illustrating various banking machine components.

With reference to FIG. 3, the input devices can include a card reader schematically indicated at 24. Card reader 24 can be operative to read a customer's card which includes data thereon. For example, the indicia on the card can correspond to information about the customer and/or information about a customer's financial account, such as, but not limited to, the customer's account number. In some embodiments, the card reader 24 can be a card reader adapted for reading at least one of magnetic stripe cards, RFID cards (e.g., cards that can be read wirelessly). Exemplary embodiments may include features of the type discussed in U.S. Pat. No. 7,118,031, the disclosure of which is incorporated herein by reference.

Another input device in the exemplary embodiment can include input keys 26. Input keys 26 can be arranged in a keypad or keyboard. Input keys 26 may alternately or in addition include function keys or other types of devices for receiving manual inputs. It should be understood that in various embodiments other types of input devices may be used such as biometric readers, speech or voice recognition devices, inductance type readers, IR type readers, touch-screens, and other devices capable of communicating with a person, article or computing device, radio frequency type readers and other types of devices which are capable of receiving information that identifies a customer and/or their account.

The exemplary embodiment of machine 10 also includes output devices providing outputs to the customer. In the exemplary embodiment, machine 10 includes a display 28, wherein display 28 can be, but is not limited to being, an LCD, CRT and/or other type display that is capable of providing visible indicia to a customer. In other embodiments, output devices can include devices such as audio speakers, RF transmitters, IR transmitters or other types of devices that are capable of providing outputs which may be perceived by a user either directly or through use of a computing device, article, or machine. It should be understood that embodiments can also include combined input and output devices such as a touch screen display, which is capable of providing outputs to a user as well as receiving inputs.

The exemplary embodiment of the automated banking machine 10 also includes a receipt printer schematically indicated at 30. The receipt printer is operative to print receipts for users reflecting transactions conducted at the machine. Embodiments can also include other types of printing mechanisms such as statement printer mechanisms, ticket printing mechanisms, check printing mechanisms and other devices that operate to apply indicia to media in the course of performing transactions carried out with the machine 10.

Automated banking machine 10 further includes one or more processors schematically indicated at 33. Processor 33, alternately referred to as a computer or a controller, is in operative connection with at least one memory or data store which is schematically indicated at 34. The processor 33 is operative to carry out programmed instructions to achieve operation of the machine in accomplishing transactions. The processor 33 is in operative connection with a plurality of the transaction function devices included in the machine.

The exemplary embodiment includes at least one communications device 36. The communications device 36 can be one or more of a plurality of types of devices that enable the machine 10 to communicate with other systems and devices for purposes of carrying out transactions. For example, communications device 36 can include a modem for communicating messages over a data line or wireless network, with one or more other computers that operate to transfer data representative of the transfer of funds in response to transactions conducted at the machine 10. Alternately, the communications device 36 can include various types of network interfaces, line drivers or other devices suitable to enable communication between the machine 10 and other computers and systems. Exemplary embodiments may include features like those disclosed in U.S. Pat. No. 7,266,526, the disclosure of which is incorporated herein by reference.

ATM 10 can further include a safe or chest 40 enclosing a secure area 42. Secure area 42 is used in the exemplary embodiment to house critical components and valuable documents. Specifically in the exemplary embodiment, secure area 42 is used for housing currency, currency dispensers, currency stackers, and other banking machine components. For purposes of this disclosure a cash dispenser shall include any mechanism that makes currency stored within the machine accessible from outside the machine. Cash dispensers may include features of the type disclosed in U.S. Pat. Nos. 7,261,236; 7,240,829; 7,114,006; 7,140,607 and 6,945,526, the disclosures of which are incorporated herein by reference.

Chest 40 includes a chest housing 44 including a top wall 46 having an upper surface 48 outside of the secure area 42. Top housing 12 is supported on the chest 40 such that the secure area 42 is generally below the interior area 20.

Chest 40 further includes a chest door 50 that is moveably mounted in supporting connection with the housing 12. Chest door 50 can be in a closed position or in an open position and can be generally closed to secure the contents of the chest 40. In other embodiments the chest opening and door may have other configurations. In the exemplary embodiment, chest door 50 can include a first device opening therethrough and cooperates with mechanisms inside and outside the chest for passing currency or other items between a customer and devices located inside the chest 40.

Referring again to FIG. 3, machine 10 also includes a plurality of sensing devices for sensing various conditions in the machine. These various sensing devices are represented schematically by component 58 for simplicity and to facilitate understanding. It should be understood that a plurality of sensing devices is provided in the machine for sensing and indicating to the processor 33 the status of devices within the machine 10.

Exemplary automated banking machine 10 further includes a plurality of actuators schematically indicated at 60 and 62 respectively. The actuators may comprise a plurality of devices such as motors, solenoids, cylinders, rotary actuators and other types of devices that are operated responsive to the processor 33. It should be understood that numerous components within the automated banking machine are operated by actuators positioned in operative connection therewith. Actuators 60 and 62 are shown to schematically represent such actuators in the machine and to facilitate understanding.

Machine 10 further comprises at least one dispenser mechanism 64 housed in secure area 42. The dispensing mechanism 64 is operatively responsive to the processor 33 to pick documents from a stack of documents 66 housed in one or more canisters which may be alternatively referred to herein as cassettes 68 or cartridges 68. The dispenser mechanism 64 can include a first document delivery system 100 that transports the document from the cartridge 68 to a document analysis area 102 via a first transport path 104. After being analyzed by the document analysis area 102 or passing through the document analysis area 102, the document can be collected. The picked documents may be arranged and collected by an accumulator mechanism 70 for presentation through a delivery mechanism 74 which operates to transport document(s) to a customer via a second document delivery system 106 or to a retract/reject bin 108 (discussed in more detail below) via the second document delivery system 106.

When chest door 50 is in the closed position, at least an end portion of a delivery mechanism 74 extends through first opening 56 in the chest door 50. In response to operation of the processor 33, when a desired number of document(s) have been collected in a stack, the stack is moved through delivery mechanism 74, wherein delivery mechanism 74 can include an opening 110.

As the sheets are moved through delivery mechanism 74 toward the first opening 56, the controller 32 operates a suitable actuating device to operate a gate 78 so as to enable the stack of document(s) to pass outward through the opening 56. As a result, the user is enabled to receive the documents from the machine 10. After a user is sensed as having removed the stack from the opening, the controller 32 can operate to close the gate 78 so as to minimize the risk of tampering with the machine 10.

Figure 2:
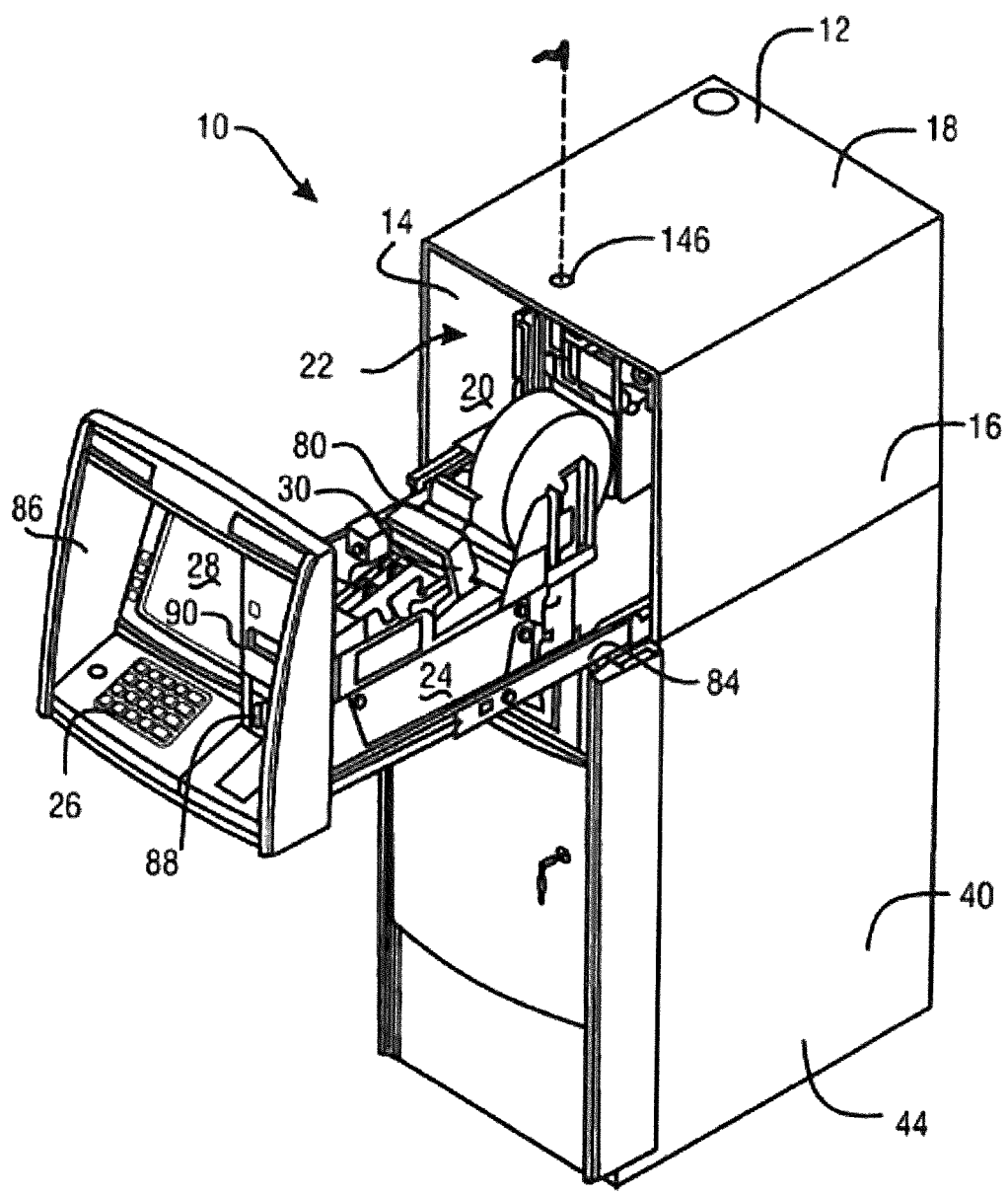
FIG. 2 is an isometric view of an automated teller machine of FIG. 1 with a rollout tray extended.

With reference to FIG. 2, in this exemplary embodiment, ATM 10 further includes a rollout tray 80. Rollout tray 80 is moveably mounted in supporting connection with slides 84. The slides 84 enable movement of the rollout tray 80 between the extended position shown in FIG. 2 and a retracted position within the interior area 20 of the top housing 12. Rollout tray 80 in the exemplary embodiment may be similar to that shown in U.S. Pat. No. 6,082,616, the disclosure of which is incorporated by reference as if fully rewritten herein.

Rollout tray 80 may have several upper banking machine components supported thereon including card reader 24, input keys 26, display 28, receipt printer 30, and other components as appropriate for the particular ATM 10.

This exemplary embodiment further includes an upper fascia 86 in supporting connection with rollout tray 80. The upper fascia 86 may include user interface openings such as a card opening 88 through which a customer operating the machine 10 may insert a credit, debit or other card, or a receipt delivery slot 90 through which printed transaction receipts may be delivered to the customer. Rollout tray 80 moveably supports upper fascia 86 relative to the top housing 12 so that upper fascia 86 is movable between a first position covering the front opening and a second position in which the upper fascia is disposed from the front opening 22.

As illustrated in FIG. 1, in the operative condition of ATM 10, the rollout tray 80 is retracted into the interior area 20 of the housing 12. Upper fascia 86 operates to close front opening 22 and provide an attractive appearance for ATM 10, while allowing a customer to input information and receive outputs from ATM 10.

Figure 4:
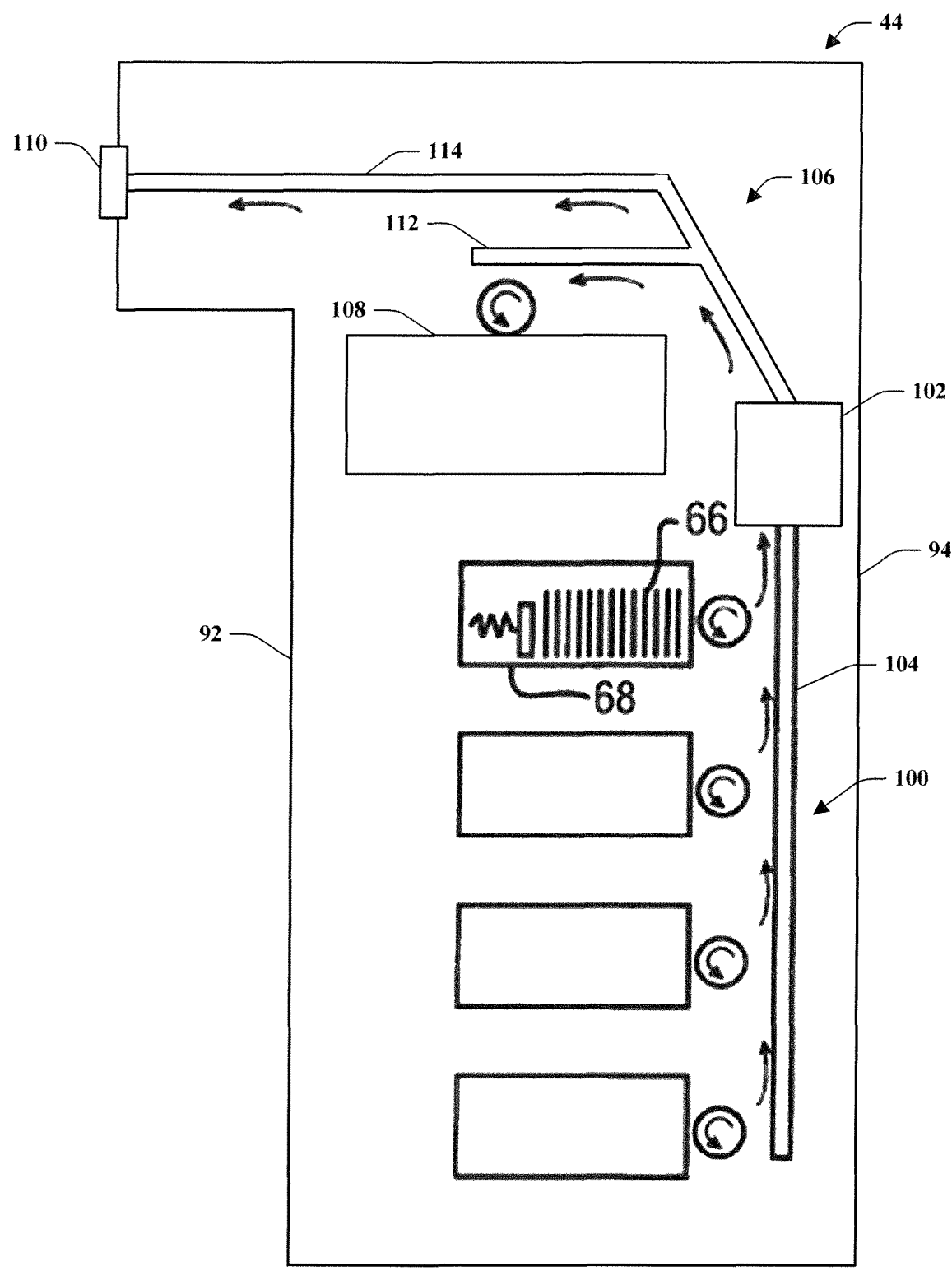
FIG. 4 is a side schematic view of an automated teller machine illustrating various banking machine components.

Turning to FIG. 4, the document analysis area 102 is illustrated. The document analysis area 102 is illustrated in FIG. 4 from a cross-sectional side view (perspective from the sidewall 16 of machine 10). The cartridge(s) 68 can be inserted from a front of the machine 10 indicated at 92 in which the front 92 is opposite to a rear of the machine 10 indicated at 94. Such a load configuration can be referred to as a "front load" automated teller machine 10. It is to be appreciated and understood that the cartridge(s) 68 can be inserted from a rear of the machine 10 indicated at 94. Such a load configuration can be referred to as a "rear load" automated teller machine 10. The first document delivery system 100 can transport, via the first transport path 104, a document from at least one cartridge 68 to the document analysis area 102. The document analysis area 102 can capture an image of the document. Based on one or more parameters of the machine 10, the document can be transported from the document analysis area 102 to either a retract/reject bin 108 via a second transport path 112 or the opening 110 of the machine 10 via a third transport path 114. By way of example, the parameter can be at least one of a detection of a misfeed, detection of more than one document, detection of a counterfeit document, an error or a fault of the machine 10, a non-capturing of an image of the document, among others.

In another example, the second document delivery system 106 can transport one or more documents from the opening 110 to the retract/reject bin 108 via at least one of the second transport path 112, the third transport path 114, or a fourth transport path. It is to be appreciated that the second document delivery system 106 can transport one or more documents from the opening 110 to the retract/reject bin 108 after a duration of time passes in which a customer does not remove the one or more documents from the opening 110. The retract/reject bin 108 is more fully described in U.S. Pat. No. 7,121,461, filed on Oct. 17, 2006 and is incorporated herein by reference. For instance, the retract/reject bin can include a first section that receives documents that are rejected and a second section that receives documents that are retracted.

It is to be appreciated that the first document delivery system 100, the second document delivery system 106, and/or additional document delivery systems can include various components, mechanical devices, and electronics such as, but not limited to, feed rollers, belt drives, axles, shafts, drive shafts, platen, rollers, plates, gears, and the like. It is to be understood that various techniques can be employed to transport the document from a first location to a second location either within the machine 10 or to an exterior of the machine 10. Moreover, it is to be appreciated that two or more document delivery systems can be employed with the subject innovation and/or three or more transport paths can be employed with the subject innovation. Still further, the subject innovation is intended to include the machine 10 that utilizes one document delivery system and/or one transport path.

Figure 5:
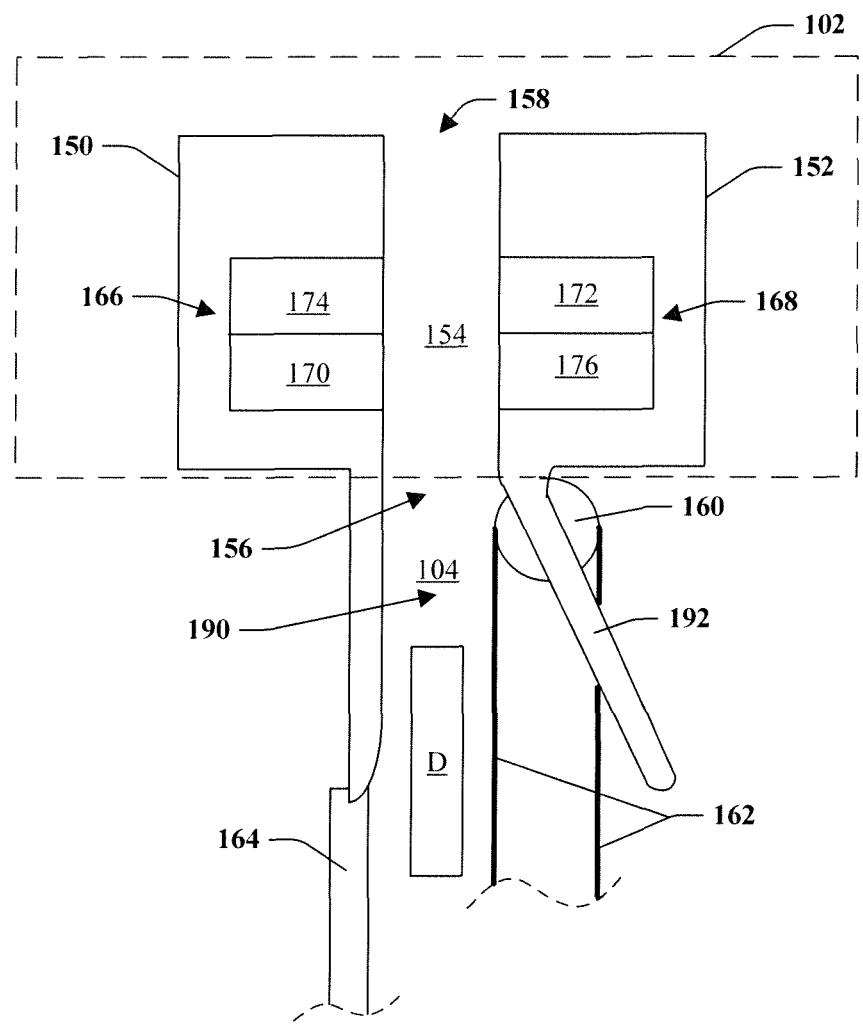
FIG. 5 is a side schematic block diagram view of an automated teller machine illustrating a document analysis area for an automated teller machine.

Turning to FIG. 5, the document analysis area 102 is illustrated with a cross-sectional view. It is to be appreciated that although document analysis 102 is depicted such that a travel path of the document is perpendicular in comparison to a ground level of where the machine 10 is located, any suitable travel direction or travel path orientation of the document can be employed with the subject innovation. By way of example and not limitation, the travel path orientation can be at least one of the following in comparison to the ground level of the machine 10, parallel, perpendicular, angled (e.g., angled at X degrees where X is an integer between 0 and 360 degrees or X is an integer between 0 and −360 degrees), a combination thereof, and the like. Moreover, the travel path of the document can be straight, curved, or a combination thereof.

The document analysis area 102 is a location within the automated teller machine 10 that can capture an image of a portion or an area of the document. The first document delivery system 100 can transport a document from the cartridge 68 to the document analysis area 102 and the second document delivery system 106 can transport the document from the document analysis area 102 to another location (e.g., retract/reject bin 108, opening 110, among others). In order to capture an image of the document, an unobstructed line of sight of the document is necessary which translates into the document analysis area being free of feeder rolls, belts, and/or any other components used with a document delivery system. By way of example and not limitation, the document analysis area 102 can include one or more scan components, positioned in an area that has an unobstructed line of sight, that are configured to capture an image of the document or a portion of the document.

The document analysis area 102 can include a cartridge side platen 150 and a belt side platen 152 opposite thereof (referred to collectively as "platens"). The cartridge side platen 150 and the belt side platen 152 can be, for example, plates that press or hold the document while being transported through the document analysis area 102. At least one of the cartridge side platen 150 or the belt side platen 152 can be moveable in a direction substantially perpendicular in comparison to the travel path of the document (discussed in more detail below). It is to be appreciated that the subject innovation can be configured to and utilized with a location within the machine 10 that transports a document in which the location does not have document delivery system. Thus, the subject innovation is not limited to employing the moveable one or more platen in the document analysis area 102 and the moveable one or more platen can be employed in various locations throughout a transportation of one or more documents.

The cartridge side platen 150 and the belt side platen 152 are positioned to create a channel 154 in which a document D travels through. The channel 154 can include an entrance 156 and an exit 158 opposite thereto, wherein the document D enters the entrance 156 from the first transport path 104. The channel 154 can include a width sized to receive the document D. By way of example and not limitation, the channel 154 can include a width of approximately 0.9 mm to 2.9 mm. In a particular non-limiting embodiment, the width of the channel 154 can be approximately 1.9 mm.

The belt side platen 152 and/or the cartridge side platen 150 can be moveable such that at least one of the following is increased in width: the channel 154; the entrance 156; the exit 158; a portion of the first document delivery system 100; a portion of the second document delivery system 106; and/or a combination thereof.

As mentioned above, the document D can be transported to the document analysis area 102 from the cartridge 68 via the first document delivery system 100, which can, for example, include at least one feed roller 160 and a belt 162. The first document delivery system 100 can include one or more sets of feed rollers and belts. FIG. 5 illustrates the first document delivery system 100 having a single feed roller and belt but it is to be appreciated that any suitable number of feed rollers and/or belts can be employed with the subject innovation. In still another embodiment, the first document delivery system 100 can include a set of feed rollers and belts on each side of the first transport path 104 even though a single feed roller and belt is illustrated on a single side of the machine 10.

The first transport path 104 is created by at least the belt 162 and a sidewall 164. In a particular embodiment, the sidewall 164 can be a material such as, but not limited to, a plastic, a polymer, a metal, a steel, an aluminum, a low coefficient of friction material, among others. It is to be appreciated that the belt 162 can be flexible, rigid, and the like. In the example of the belt 162 being flexible, the document(s) can have a thickness that is greater than the width of the entrance 156 of the channel 154 as well as greater than a width of an area 190 between the cartridge side platen 150 and the belt side platen 152, wherein the area 190 is at an angle 192 of the belt side platen 152.

The platens (e.g., platens referring to cartridge side platen 150 and/or belt side platen 152) can have integrated therein one or more scan components that can be configured to capture an image of the document D. The document analysis area 102 is depicted as having two scan components to capture images of the document but it is to be appreciated that the document analysis area 102 can utilize one or more scan components at a location that allows at least one image of the document to be captured.

The cartridge side platen 150 can include a cartridge side scan component 166 that is configured to capture an image of a first side of the document D. Moreover, the belt side platen 152 can include a belt side scan component 168 that is configured to capture an image of a second side of the document D, wherein the first side is opposite the second side. In an example, the cartridge side scan component 166 and the belt side scan component 168 can be offset to one another, parallel to one another, overlapping to one another, and the like. By way of example and not limitation, the cartridge side scan component 166 can be integrated into location 170 and the belt side scan component 168 can be integrated into location 172 or the cartridge side scan component 166 can be integrated into location 174 and the belt side scan component 168 can be integrated into location 176. By way of example and not limitation, the cartridge side scan component 166 can be integrated into location 170 and the belt side scan component 168 can be integrated into location 176 or the cartridge side scan component 166 can be integrated into location 174 and the belt side scan component 168 can be integrated into location 172. It is to be appreciated and understood that the height of the location 170 and 174 can be approximately 35 mm to 45 mm.

The platens (e.g., cartridge side platen 150 and/or belt side platen 152) can be moveable to increase the width of the channel 154 or a portion of the channel 154 in order to reduce a number of jams that can occur in the machine 10. The platens can be moveable in a direction that is substantially parallel to a travel direction of the document within the first transport path 104 or a location between the first transport path 104 and the second document delivery system 106. By employing a moveable platen or moveable platens, the width of the entrance 156 of the channel 154 is increased to allow a larger thickness of the document D to pass through the document analysis area 102. For example, the one or more movable platens can allow the width of the entrance 156 of the channel 154 increase approximately 0.5 mm to 1.5 mm.

Conventionally, the document analysis area 102 included a channel with a fixed width and jams would occur due to the document thickness being greater than the thickness of the channel. For example, the thickness of the document D can be increased to a size larger than the width of the channel 154 due to a misfeed (e.g., more than one document together, misalignment, etc.), a deteriorated document (e.g., wrinkled, folded, worn out, etc.), a foreign material on the document D, among others.

In a non-limiting embodiment of the subject innovation, the belt side platen 152 can be moveable to increase the width of the channel 154 at the entrance 156 of the document analysis area 102. The belt side platen 152 can be moveable with, for example, a spring mechanism 178 that applies a first force to maintain or bias a position of the belt side platen 152. When a document having an increased thickness (in comparison to the width of the entrance 156) approaches the entrance 156, a second force due to the increased thickness can be greater than the first force of the spring mechanism 178 which allows the belt side platen 152 to move. This freedom of movement allows the document to be received by the document analysis area 102 rather than causing a jam. The spring mechanism 178 can be, but is not limited to being, a torsion spring, a tension spring, a coil spring, a flat spring, a leaf spring, a Bellville washer, an elastomeric band, or an elastomeric pad, among others. The spring mechanism 178 can provide compression, expansion, and/or a force in one or more directions. For example, the spring mechanism 178 can be a shape and size that provides a first force to maintain the position of the belt side platen 152 in which a second force from a misfeed or a deteriorated document against the belt side platen 152 is greater than the first force to allow movement thereof.

Figure 13:
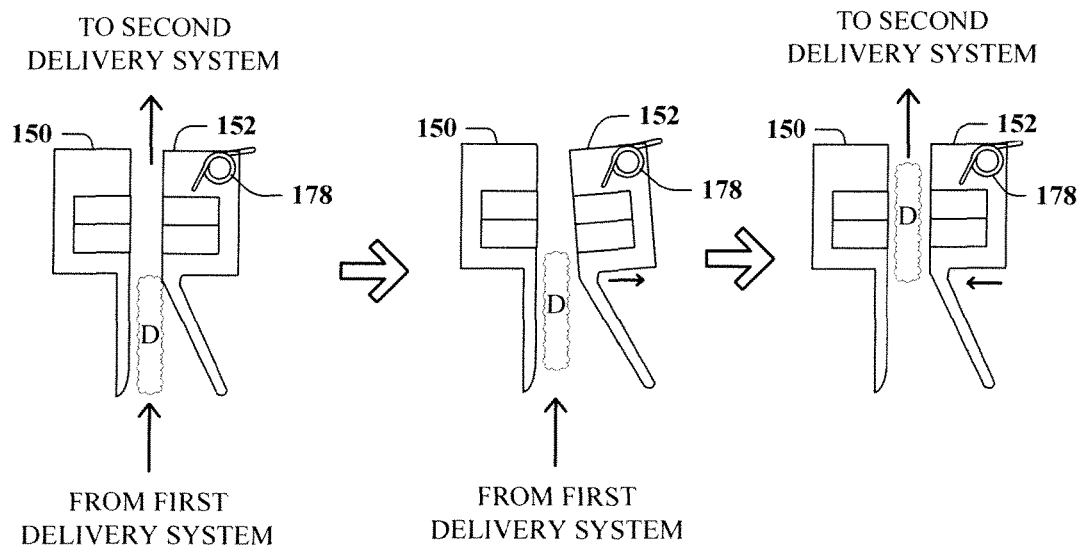
FIG. 13 is a side schematic block diagram of a sequence of a belt side platen configured for movement within a document analysis area of an automated teller machine.
Figure 14:
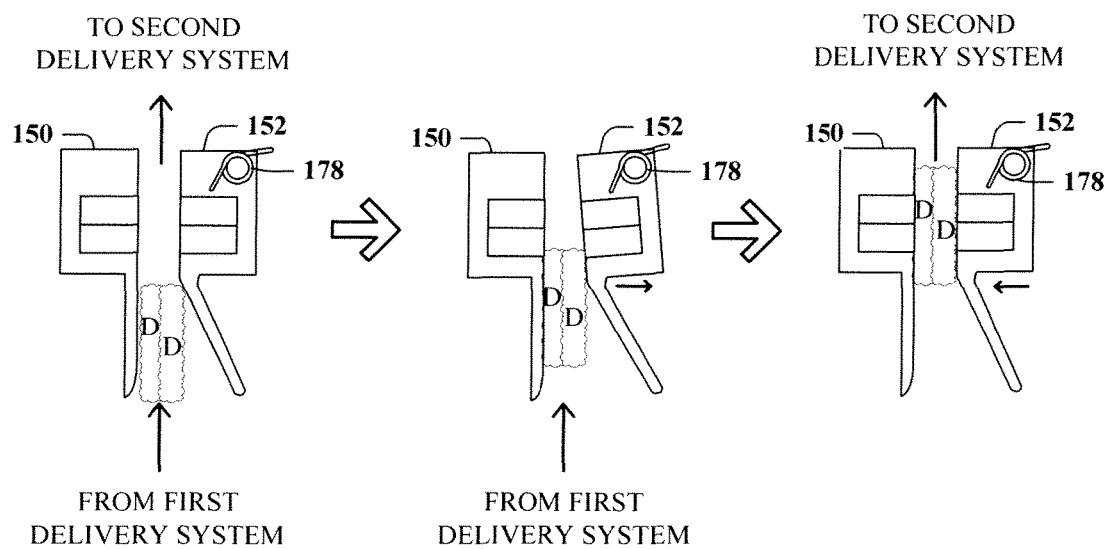
FIG. 14 is a side schematic block diagram of a sequence of a belt side platen configured for movement within a document analysis area of an automated teller machine.
Figure 18:
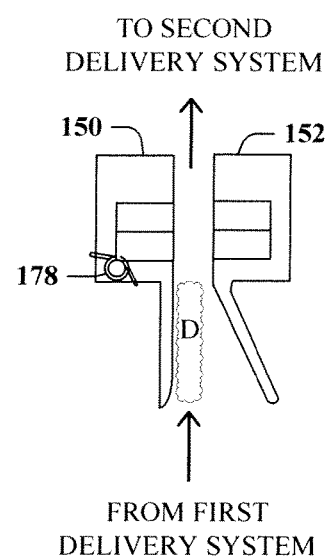
FIG. 18 is a side schematic block diagram of an embodiment of a belt side platen and a cartridge side platen utilized with an automated teller machine to virtually eliminate jamming.
Figure 19:
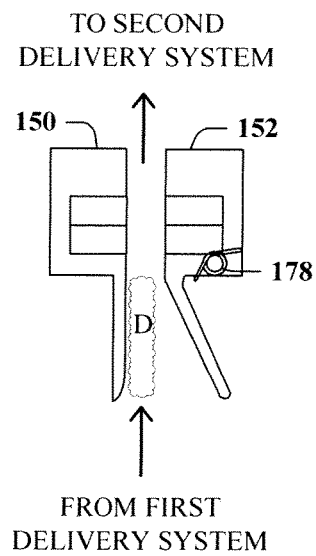
FIG. 19 is a side schematic block diagram of an embodiment of a belt side platen and a cartridge side platen utilized with an automated teller machine to virtually eliminate jamming.

In an embodiment, the belt side platen 152 can be moveable (See FIGS. 13, 14, and 19). In another embodiment, the cartridge side platen 150 can be moveable (See FIGS. 15 and 18). In still another embodiment, the cartridge side platen 150 and the belt side platen 152 can be moveable (See FIGS. 16, 17, and 20).

The cartridge side platen 150 and/or the belt side platen 152 can be coupled, removably coupled, and/or incorporated into the machine 10, and/or incorporated into a portion of the machine 10, coupled to a housing of the machine 10, and/or a combination thereof. In another embodiment, the platens can be integrated or incorporated into the machine 10, incorporated into a portion of the machine 10, and/or incorporated into a housing of the machine 10. By way of example and not limitation, the platens can be integrated or incorporated into a portion of the sidewall 164, which can be coupled to the machine 10. It is to be appreciated that the platens can be affixed to the machine 10 and one or more of the platens can be moveable at a location in which the one or more platens are affixed to the machine 10 or a housing of the machine 10.

In a particular embodiment, the cartridge side platen 150 can include at least one feed roller that is rotatable about a shaft, wherein the shaft is affixed to the machine 10 at each end of the shaft or a housing of the machine 10 at each end of the shaft. In this embodiment, the shaft can be cylindrical in shape having a first end and a second end opposite thereto. The shaft can be positioned through one or more apertures on the platen or the shaft can be coupled to the platen. By way of example and not limitation, at least one of the first end or the second end of the shaft can be affixed to the machine 10 or a housing of the machine 10, which indirectly affixes the platen to the machine 10.

The following is a description of a particular embodiment of the subject innovation and is not to be limiting. The cartridge side platen 150 can include an upper set of feed rollers and a lower set of feed rollers, wherein the upper set of feed rollers are part of the second document delivery system 106 that transports the document D from the document analysis area 102 and the lower set of feed rollers are part of the first document delivery system 100 that transport the document D from the cartridge 68 to the document analysis area 102. It is to be appreciated that one or more belts can be utilized with the first document delivery system 100 and/or the second document delivery system 106. Moreover, the upper set of feed rollers can be separated by a distance from the lower set of feed rollers, wherein within the distance one or more scan components can reside or can be positioned. The upper set of feed rollers can rotate about an upper shaft that is coupled to the machine 10 at a first end of the upper shaft and a second end of the upper shaft, wherein the first end is opposite the second end. The lower set of feed rollers can rotate about a lower shaft that is coupled to the machine 10 at a first end of the lower shaft and a second end of the lower shaft, wherein the first end is opposite the second end. The cartridge side platen 150 can be moveable about at least one of the first end of the upper shaft, the second end of the upper shaft, the first end of the lower shaft, the second end of the lower shaft, or a combination thereof.

The following is a description of a particular embodiment of the subject innovation and is not to be limiting. The belt side platen 152 can include an upper set of feed rollers and a lower set of feed rollers (e.g., feed roller 160 for example), wherein the upper set of feed rollers are part of the second document delivery system 106 that transports the document D from the document analysis area 102 and the lower set of feed rollers are part of the first document delivery system 100 that transport the document D from the cartridge 68 to the document analysis area 102. It is to be appreciated that one or more belts can be utilized with the first document delivery system 100 (e.g., belt 162 for example) and/or the second document delivery system 106. Moreover, the upper set of feed rollers can be separated by a distance from the lower set of feed rollers, wherein within the distance one or more scan components can reside or can be positioned. The upper set of feed rollers can rotate about an upper shaft that is coupled to the machine at a first end of the upper shaft and a second end of the upper shaft, wherein the first end is opposite the second end. The lower set of feed rollers can rotate about a lower shaft that is coupled to the machine at a first end of the lower shaft and a second end of the lower shaft, wherein the first end is opposite the second end. The belt side platen 152 can be moveable about at least one of the first end of the upper shaft, the second end of the upper shaft, the first end of the lower shaft, the second end of the lower shaft, or a combination thereof.

In an embodiment, a movement of the platen can be recorded for evaluation of the machine 10. For instance, a movement of the platen can indicate a document is deteriorated or can indicate a misfeed related to the document delivery system 100. A sensor can be utilized to detect a movement of the moveable platen, which can correspond to the indication of a misfeed or a document that is deteriorated. In another embodiment, a sensor can detect a position of the document and compare such image to a "master image" to determine whether the document is in a position appropriate for the document analysis area 102. Upon detection via the sensor, the machine 10 can perform an action such as, but not limited to, communicating a signal representative of the detection, storing data (e.g., date, time, transaction reference, account number used during the transaction when the movement was recorded, customer information, image data captured, serial number of document, and the like) in a log corresponding to the movement of the moveable platen, transporting the document to the retract/reject bin 108, performing a scan on the document, not performing a scan on the document, initiating a notification (e.g., alarm, electronic message, error code, among others), incrementing a counter, decrementing a counter, and/or a combination thereof. In another embodiment, the machine 10 can include a threshold for a number of detections from the sensor to indicate at least one of a replacement of documents in the cartridge 68, a maintenance of the documents or cartridge, a service to the retract/reject bin 108, and the like. In still another embodiment, the machine 10 can include a threshold for a number of detections from the sensor to indicate a maintenance or a service on the machine 10.

Figure 6:
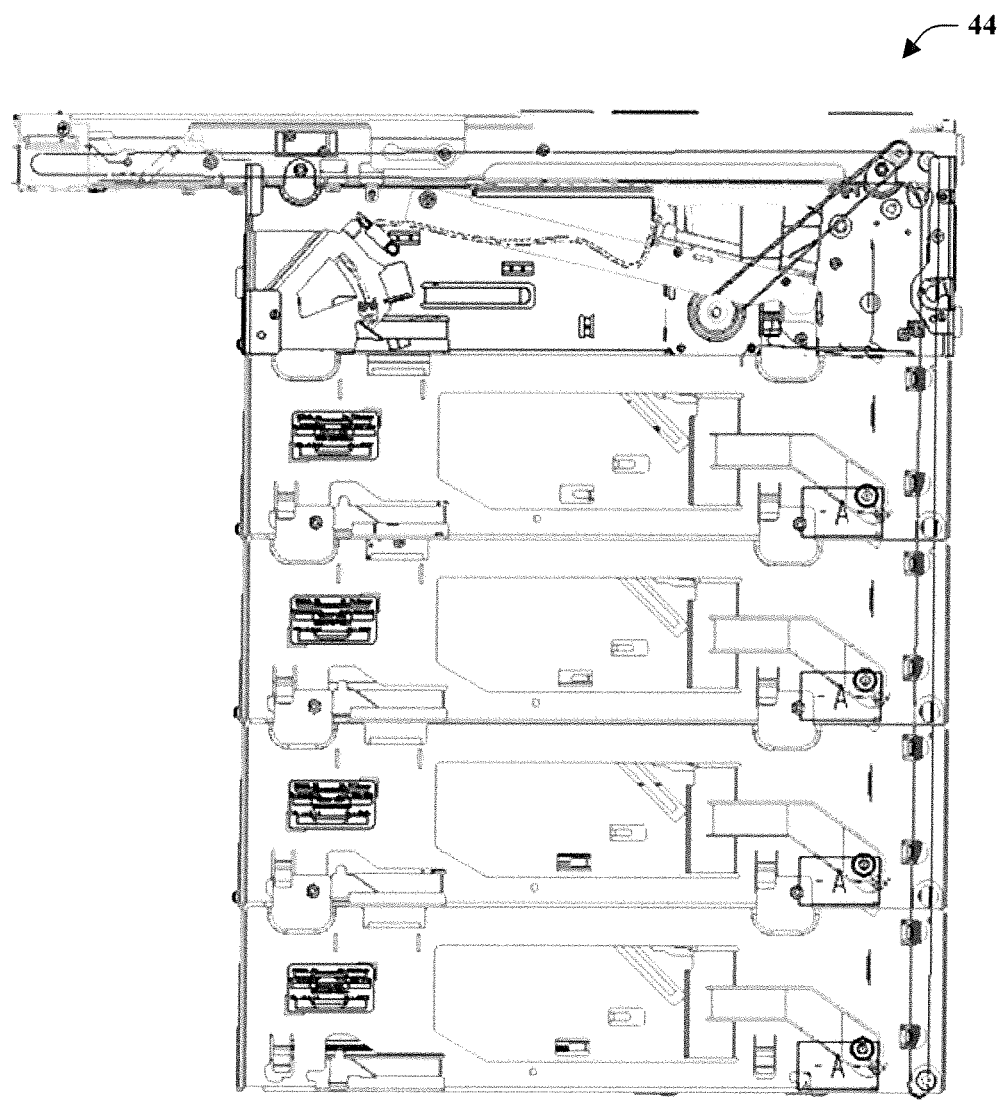
FIG. 6 is a side schematic block diagram view of an automated teller machine illustrating various banking machine components.
Figure 9:
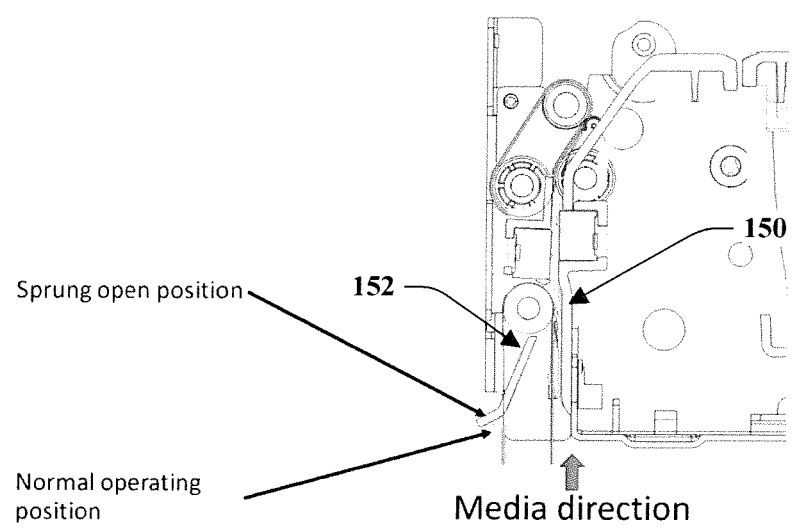
FIG. 9 is a side schematic block diagram view of a document analysis area of an automated teller machine.

FIGS. 6-9 illustrate schematic block diagrams of an automated teller machine from a side cross-sectional view. In particular, FIG. 6 is a cross-sectional schematic block diagram view of an automated teller machine illustrating various banking machine components with the perspective being from the sidewall 16 of machine 10. FIGS. 7-9 are cross-sectional schematic block diagram views of a top portion of an automated teller machine illustrating various banking machine components, wherein the perspective is from the sidewall 14 of machine 10.

Figure 10:
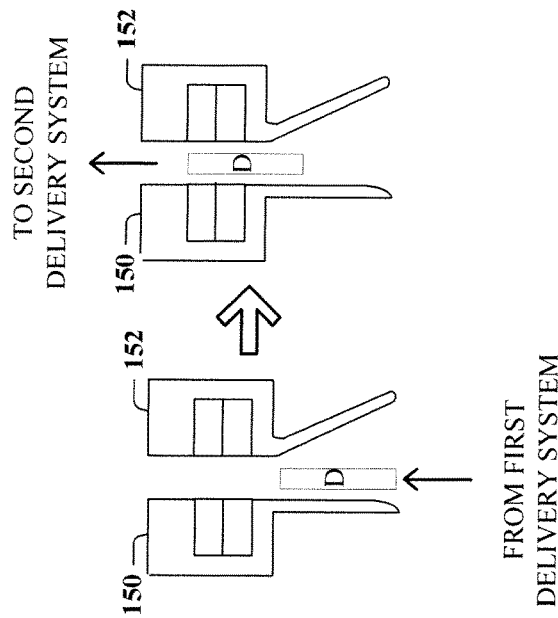
FIG. 10 is a side schematic block diagram of a sequence of a document passing through a portion of a document analysis area of an automated teller machine.

Turning to FIGS. 10-20, the document analysis area 102 is partly illustrated with a cross-sectional view. FIG. 10 illustrates a cross-sectional view of a sequence (e.g., first in time starting on the left side of the FIG. 10) the document analysis area 102 in which the document D travels through the document analysis area 102 without a jam, a misfeed, or error. The document travels (e.g., from the first document delivery system 100) to the entrance 156 of the channel 154 and passes through the channel 154 (e.g., to the second document delivery system 106) while an image of the document is captured at the document analysis area 102.

Figure 11:
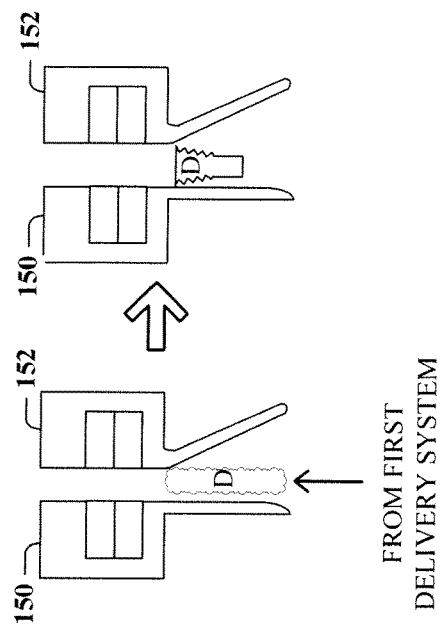
FIG. 11 is a side schematic block diagram of a sequence of a document getting jammed while attempting to travel through a portion of a document analysis area of an automated teller machine.

FIG. 11 illustrates a sequence (e.g., first in time starting on the left side of the FIG. 11) of an example of a jam of the document D in which maintenance or service is required to remove the jammed document. The document D travels to the entrance 156 but due to an increased thickness of the document D, the thickness of the document D is greater than the width of the entrance 156 for the channel 154 within the document analysis area 102. Thus, the document D is too thick to travel through the entrance 156 and/or the channel 154, which causes the document D to jam or clog the first transport path 104.

Figure 12:
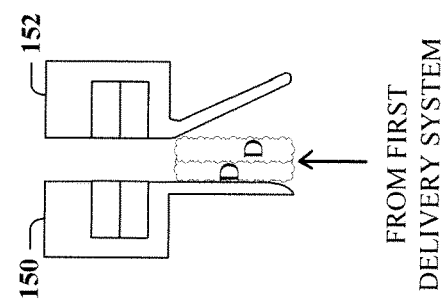
FIG. 12 is a side schematic block diagram of a sequence of a document getting jammed while attempting to travel through a portion of a document analysis area of an automated teller machine.

FIG. 12 illustrates an example of a misfeed of documents D in which maintenance or service is required to remove the misfed documents. The documents D travel to the entrance 156 but due to an increased thickness since there are more than one document D, the thickness of the documents D are greater than the width of the entrance 156 for the channel 154 within the document analysis area 102. Thus, the documents D are too thick to travel through the entrance 154 and/or the channel 156, which causes the documents D to jam the machine 10.

FIG. 13 illustrates a sequence (e.g., first in time starting on the left side of the FIG. 13) of the document analysis area 102 utilizing moveable belt side platen 152 to avoid occurrence of a jam due to a deteriorated document, wherein the deterioration increases the thickness of the document. It is to be appreciated that the description of the belt side platen 152 and mobility related thereto can be applied to the cartridge side platen 150. The document is delivered to the entrance of the channel of the document analysis area 102 via the first document delivery system 100. Based on the thickness of the document D being larger than the width of the entrance 156 of the channel 154, a jam or misfeed can occur using conventional non-moveable platens. However as described in the subject innovation, the belt side platen 152 can be moveable with the spring mechanism 178. As illustrated, the movement can be substantially perpendicular to the first transport path 104 of the document D (and away from the first transport path) which allows the width of the entrance 156 or the channel 154 to increase, allowing the document to pass into the channel 154 without jam or misfeed. In another embodiment, the movement of the platen can have a curved trajectory, straight trajectory, among others. Once a portion of the document passes into the channel 154 and the document passes the entrance 156, the belt side platen 152 can move toward the first transport path 104 (e.g., return to the first position). Similarly, FIG. 14 illustrates a sequence in which the belt side platen 152 moves to avoid a jam due to a misfeed in which more than one document travels to the document analysis area 102.

FIGS. 15-20 illustrate the spring mechanism or spring mechanisms that can be utilized with the document analysis area 102 and in particular the cartridge side platen 150 and/or the belt side platen 152. It is to be appreciated that each platen can include one or more shafts to which one or more feed rollers or belts rotate about. By way of example and not limitation, there can be an upper shaft and a lower shaft on each platen as illustrated in FIGS. 15-20. One or more spring mechanisms can be positioned on the upper shaft or lower shaft for one or more platen. In a non-limiting embodiment, the spring mechanism or mechanisms can be on ends of the shaft (e.g., lower shaft, upper shaft, and/or a combination thereof), a position between the ends of the shaft, on the platen, or a combination thereof.

Figure 15:
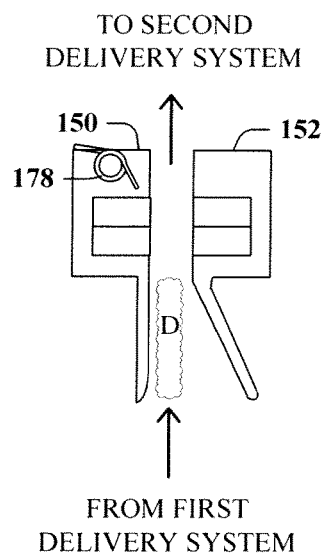
FIG. 15 is a side schematic block diagram of an embodiment of a belt side platen and a cartridge side platen utilized with an automated teller machine to virtually eliminate jamming.

FIG. 15 illustrates a cross-sectional view of the document analysis area 102 (and specifically the cartridge side platen 150 and the belt side platen 152) in which the spring mechanism 178 is on an upper shaft of the cartridge side platen 150.

Figure 16:
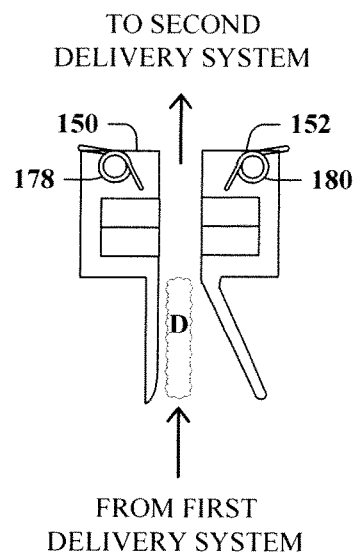
FIG. 16 is a side schematic block diagram of an embodiment of a belt side platen and a cartridge side platen utilized with an automated teller machine to virtually eliminate jamming.

FIG. 16 illustrates a cross-sectional view of the document analysis area 102 (and specifically the cartridge side platen 150 and the belt side platen 152) in which the spring mechanism 178 is on an upper shaft of the cartridge side platen 150 and a spring mechanism 180 is on an upper shaft of the belt side platen 152.

Figure 17:
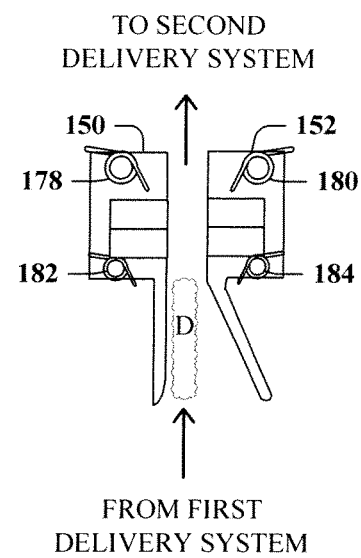
FIG. 17 is a side schematic block diagram of an embodiment of a belt side platen and a cartridge side platen utilized with an automated teller machine to virtually eliminate jamming.

FIG. 17 illustrates a cross-sectional view of the document analysis area 102 (and specifically the cartridge side platen 150 and the belt side platen 152) in which the spring mechanism 178 is on an upper shaft of the cartridge side platen 150, the spring mechanism 180 is on an upper shaft of the belt side platen 152, a spring mechanism 182 is on a lower shaft of the cartridge side platen 150, and a spring mechanism 184 is on a lower shaft of the belt side platen 152.

FIG. 18 illustrates a cross-sectional view of the document analysis area 102 (and specifically the cartridge side platen 150 and the belt side platen 152) in which the spring mechanism 178 is on a lower shaft of the cartridge side platen 150.

FIG. 19 illustrates a cross-sectional view of the document analysis area 102 (and specifically the cartridge side platen 150 and the belt side platen 152) in which the spring mechanism 178 is on a lower shaft of the belt side platen 152.

Figure 20:
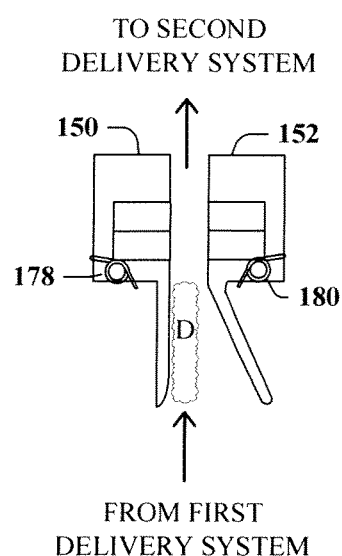
FIG. 20 is a side schematic block diagram of an embodiment of a belt side platen and a cartridge side platen utilized with an automated teller machine to virtually eliminate jamming.
Figure 21:
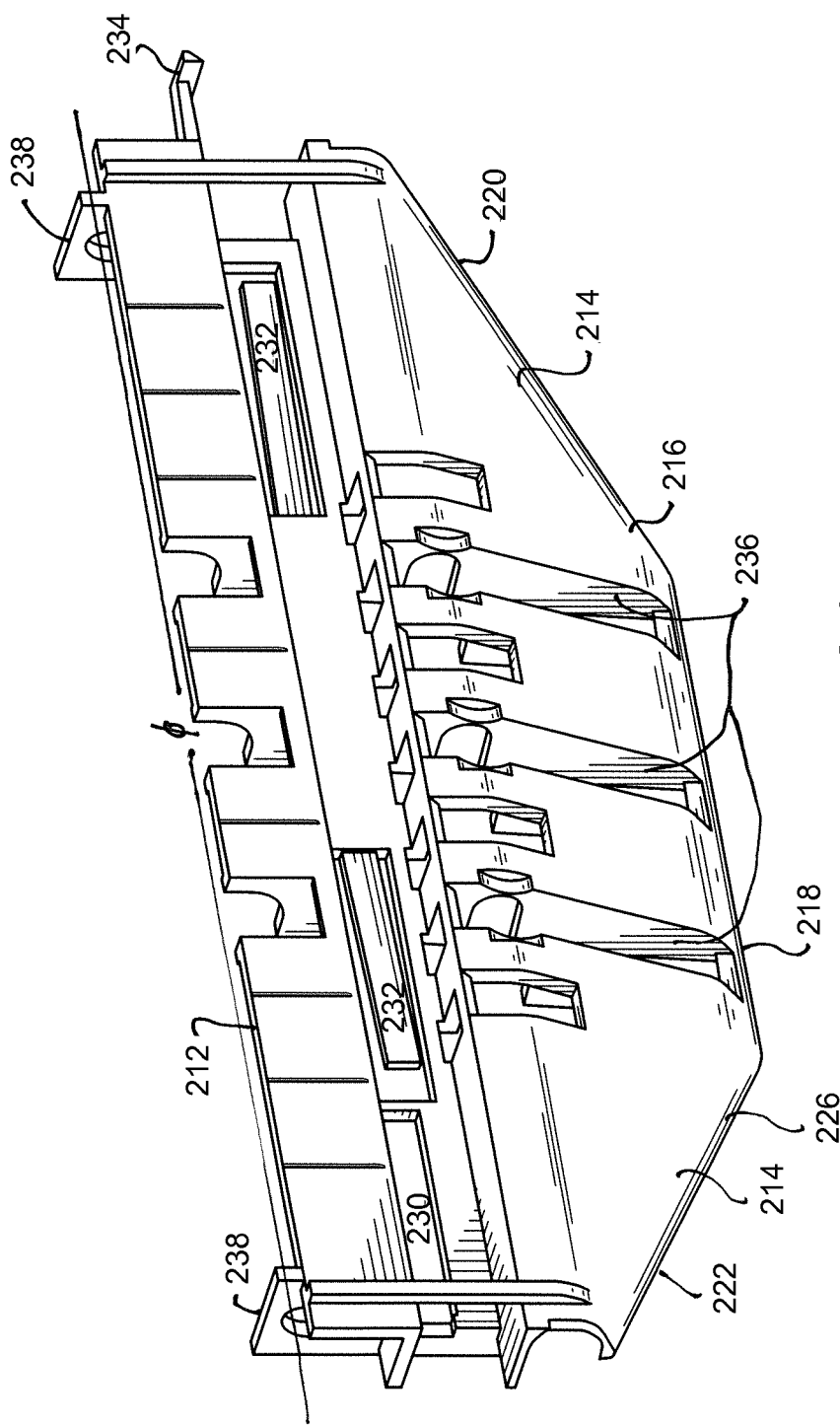
FIG. 21 is a perspective view of a belt side platen for use with an automated teller machine according to one embodiment.
Figure 22:
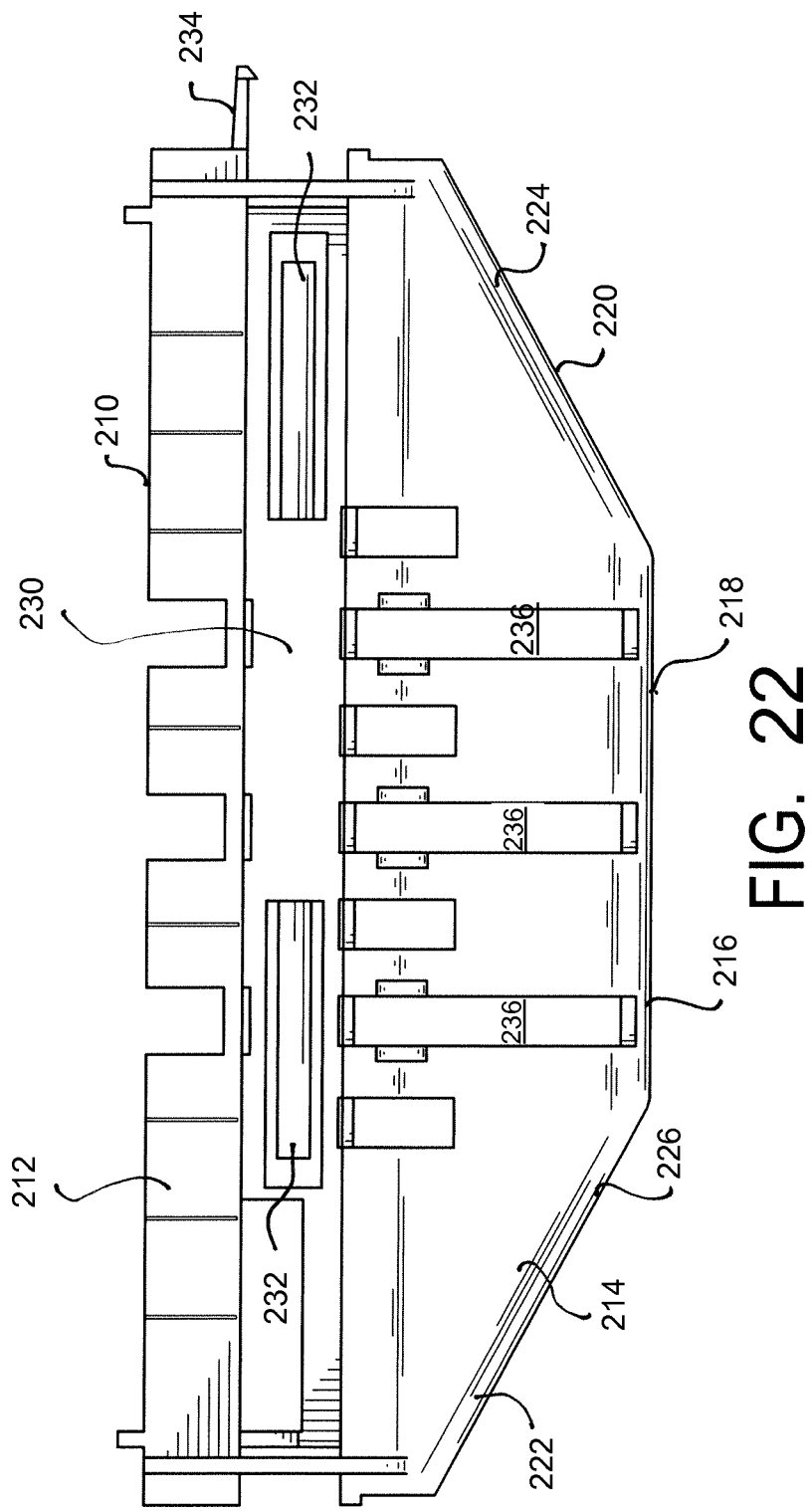
FIG. 22 is a front view of the belt side platen of FIG. 21.
Figure 23:
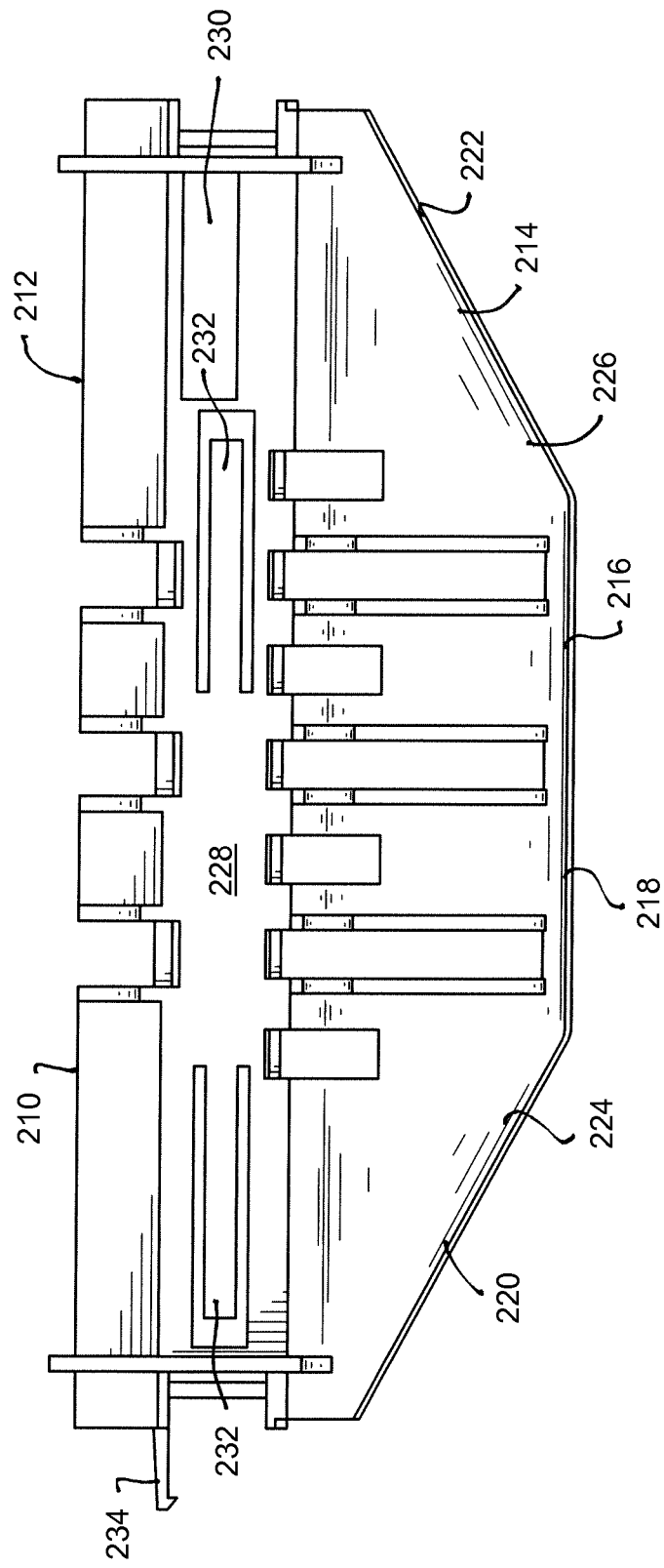
FIG. 23 is a back view of the belt side platen of FIG. 21.
Figure 24:
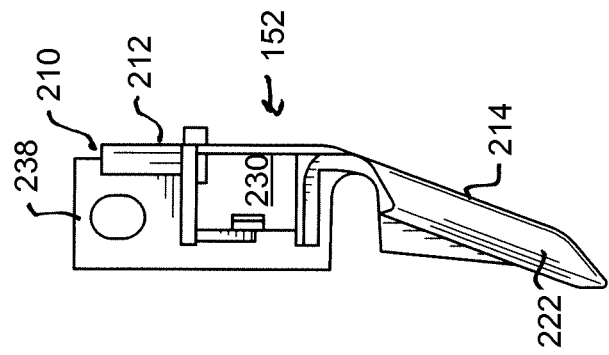
FIG. 24 is a first side view of the belt side platen of FIG. 21.
Figure 25:
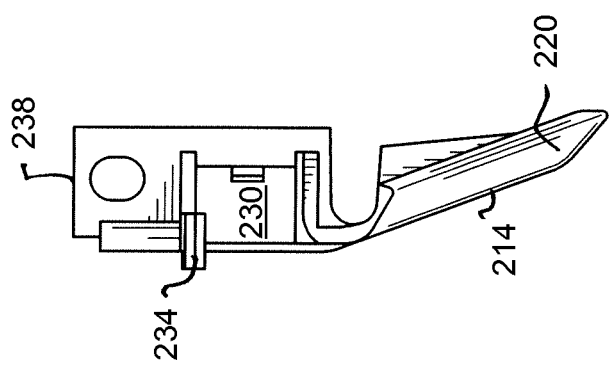
FIG. 25 is a second side view of the belt side platen of FIG. 21.

FIG. 20 illustrates a cross-sectional view of the document analysis area 102 (and specifically the cartridge side platen 150 and the belt side platen 152) in which the spring mechanism 178 is on the lower shaft of the cartridge side platen 150 and the spring mechanism 180 is on the lower shaft of the belt side platen 152.

As best shown in FIGS. 21-27, the belt side platen 152 is formed from a generally planar substrate 210. The substrate 210 maybe composed of metal, plastic or any other material suitable to be formed into the belt side platen 152 and function within the ATM 10. The substrate 210 including an upper portion 212 and lower portion 214. The lower portion 214 slopes at an angle relative to the upper portion 212. The lower portion 214 has a lower edge 216 having a central edge section 218 that extends generally laterally along the lower edge 216. The lower edge 216 also has first and second end edge sections 220 and 222 tapering from the central edge 218 toward the upper portion 212 opposite one another.

The edge sections 220 and 222 each include an optional flange 224 and 226 extending from the edge section toward a rear face 228 of the belt side platen 152.

The substrate 210 defines a generally longitudinally extending channel 230 between the upper portion 212 and the lower portion 214. The channel 230 includes optional tabs 232 capable of flexing into the channel to engage a module inserted into the channel 230, such as sensors or imagers. The tabs 232 may be utilized to assist in retaining such modules within the channel 230 or to assist in the removal of such modules from the channel 230.

The belt side platen 152 further includes an optional retaining arm 234 extending from the substrate 210 that may assist in retaining a module disposed with the channel 230.

The substrate 210 defines a plurality of longitudinally extending apertures 236 in the lower portion 214 for the passage of belts 162 for the transport of documents.

The belt side platen 152 further includes a pair of bearing surfaces 238 attached to the substrate 210 for engagement with a bearing member (not shown) for at least partial rotation of the platen about an axis Φ through the bearing surfaces 238. The bearing surfaces 138 are attached to the upper portion 212.

The aforementioned systems, devices, applications, modules, components, (e.g., controller, processor, first document delivery system 100, second document delivery system 106, document analysis area 102, cartridge side platen 150, belt side platen 152, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

As used herein, the terms "component," "module," and "system," as well as forms thereof are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

It is to be appreciated that an "application" can include one or more modules that perform one or more functionalities via instructions stored on a memory executed by a processor. Moreover, although a module and functionality may be described as a single module, it is to be appreciated that modules and respective functionalities can be combined into two or more modules. Additionally, one or more applications can be provided to include the one or more modules described herein.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A platen for an automated teller machine comprising:
    a generally planar substrate including an upper portion and lower portion, the lower portion sloping at an angle relative to the upper portion, the lower portion having a lower edge having a central edge section extending generally laterally along the lower edge and having a first end edge section tapering from the central edge toward the upper portion, and a second end edge section tapering from the central edge toward the upper portion opposite the first end edge section,
    where the first and second end edge sections each include a flange extending from each of the end edge sections toward a rear face of the platen, and
    where the substrate defines a generally longitudinally extending channel between the upper portion and the lower portion.

2. The platen of claim 1 where the substrate defines a plurality of longitudinally extending apertures in the lower portion for the passage of belts for the transport of documents.

3. The platen of claim 1 further comprising a pair of bearing surfaces attached to the substrate for engagement with a bearing member for at least partial rotation of the platen about an axis through the bearing surfaces.

4. The platen of claim 3 where the bearing surfaces are attached to the upper portion.

5. A platen for an automated teller machine comprising:
    a generally planar substrate including an upper portion and lower portion, the lower portion sloping at an angle relative to the upper portion, the lower portion having a lower edge having a central edge section extending generally laterally along the lower edge and having at least one end edge section tapering from the central edge toward the upper portion,
    where the substrate defines a generally longitudinally extending channel between the upper portion and the lower portion, and
    where the channel includes at least one tab capable of flexing into the channel to engage a module inserted into the channel.

6. The platen of claim 5 wherein the lower edge further has a second end edge section tapering from the central edge toward the upper portion opposite the first end edge section.

7. The platen of claim 5 wherein the at least one end edge section includes a flange extending from the at least one end edge section toward a rear face of the platen.

8. The platen of claim 5 where the substrate defines a plurality of longitudinally extending apertures in the lower portion for the passage of belts for the transport of documents.

9. The platen of claim 5 further comprising a pair of bearing surfaces attached to the substrate for engagement with a bearing member for at least partial rotation of the platen about an axis through the bearing surfaces.

10. The platen of claim 9 where the bearing surfaces are attached to the upper portion.

11. A platen for an automated teller machine comprising:
    a generally planar substrate including an upper portion and lower portion, the lower portion sloping at an angle relative to the upper portion, the lower portion having a lower edge having a central edge section extending generally laterally along the lower edge and having at least one end edge section tapering from the central edge toward the upper portion,
    where the substrate defines a generally longitudinally extending channel between the upper portion and the lower portion, and
    where the platen further included a retaining arm extending from the substrate to retain a module disposed with the channel.

12. The platen of claim 11 wherein the lower edge further has a second end edge section tapering from the central edge toward the upper portion opposite the first end edge section.

13. The platen of claim 11 wherein the at least one end edge section includes a flange extending from the at least one end edge section toward a rear face of the platen.

14. The platen of claim 11 where the substrate defines a plurality of longitudinally extending apertures in the lower portion for the passage of belts for the transport of documents.

15. The platen of claim 11 further comprising a pair of bearing surfaces attached to the substrate for engagement with a bearing member for at least partial rotation of the platen about an axis through the bearing surfaces.

16. The platen of claim 15 where the bearing surfaces are attached to the upper portion.

* * * * *